United States Patent [19]
Deats

[11] 3,777,713
[45] Dec. 11, 1973

[54] MOBILE HAY FEEDER
[76] Inventor: Richard A. Deats, Cobleskill, N.Y.
[22] Filed: Nov. 5, 1971
[21] Appl. No.: 196,144

[52] U.S. Cl. ................................................ 119/60
[51] Int. Cl. ............................................. A01k 5/00
[58] Field of Search .............................. 119/58, 60

[56]     References Cited
         UNITED STATES PATENTS

| | | | |
|---|---|---|---|
| 2,768,607 | 10/1956 | McClure, Jr. | 119/60 |
| 387,892 | 8/1888 | Light | 119/60 |
| 1,319,060 | 10/1919 | Gardon | 119/60 |
| 3,067,723 | 12/1962 | Norwood | 119/60 X |
| 3,020,881 | 2/1962 | Strom | 119/60 X |
| 375,824 | 1/1888 | Light | 119/60 |

Primary Examiner—Russell R. Kinsey
Assistant Examiner—James H. Czerwonky
Attorney—David S. Kane et al.

[57] ABSTRACT

A portable animal feeder includes top and bottom vertically spaced annular rings. A series of angularly disposed posts connect the top and bottom rings and are spaced sufficiently apart to permit the passage of animal heads therethrough. Means are provided to prevent spillage of animal feed placed in the feeder. To facilitate loading of the feed into the device, an optional gate is provided in the side of the feeder. A supporting ring is spaced below the bottom ring by supporting struts, and floor means are mounted in the feeder adjacent the bottom ring.

5 Claims, 12 Drawing Figures

INVENTOR
RICHARD A. DEATS

INVENTOR
RICHARD A. DEATS

INVENTOR
RICHARD A. DEATS

INVENTOR
RICHARD A. DEATS

MOBILE HAY FEEDER

BACKGROUND OF THE INVENTION

The invention relates generally to mobile animal feeders and, in particular, to an improved portable feeder of light weight construction and low cost.

Farmers have long desired a mobile, light-weight and inexpensive animal feeder and, particularly, an inexpensive cattle feeder which can be turned on its side and easily rolled to that portion of the farm where it is most needed. Previous animal feeders have not proved satisfactory and have not received significant commercial acceptance.

An example of prior art feeders is illustrated in U.S. Pat. No. 3,020,881. Such a cattle feeder has only six access openings, thereby necessitating an extended feed time for a large herd of animals. Owing to the vertical nature of the access opening to the feeder, it is necessary to provide telescoping, vertical posts to adjust the size of the feeder to admit both large cattle and calves, for example. Such adjustable access sections render the feeder more complicated and expensive.

Additionally, the U.S. Pat. No. 3,020,881 proposes that rings 38 and 40 be provided to reduce the speed of falling feed in order to prevent packing of the feed at the bottom of the device. The feeder also employs a feed spreader spaced at the bottom of the unit. In order to permit the feed spreader to be installed, shackles are employed to detach rings 38 and 40 to allow easy introduction of the feed spreader. Again, the provision for shackles adds to the cost, bulkiness and size of the feeder, thereby detracting from its commercial significance.

SUMMARY OF THE INVENTION

It is, therefore, a primary object of the invention to provide an improved mobile animal feeder capable of feeding a variety of animals without adjustment of its feeding stations and adapted to feed, simultaneously, a relatively large number of animals.

It is an additional object of the invention to provide an improved animal feeder capable of being loaded from the top or the side.

It is another object of the invention to provide an improved animal feeder requiring minimum assembly, maintenance and adjustment.

The above and other objects are met in an improved portable animal feeder having top and bottom vertically spaced annular rings wherein a plurality of posts disposed in substantially parallel angular relation connect the top and bottom rings and are spaced sufficiently apart to permit unimpeded entry of animal heads. Blocking means can be provided circumferentially disposed above the bottom ring to prevent spillage of animal feed. In order to further reduce spillage, an annular floor may be provided spaced adjacent the bottom ring. A gate may be provided in the side of the animal feeder to permit feed to be loaded therethrough.

Other objects and advantages will become apparent from the following detailed description and accompanying drawings, wherein.

DESCRIPTION OF THE PREFERRED EMBODIMENTS

Figure 1:
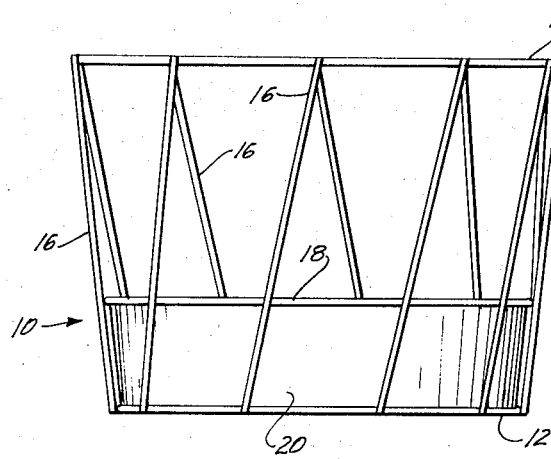
FIG. 1 is a perspective view of an animal feeder of the invention.
Figure 2:
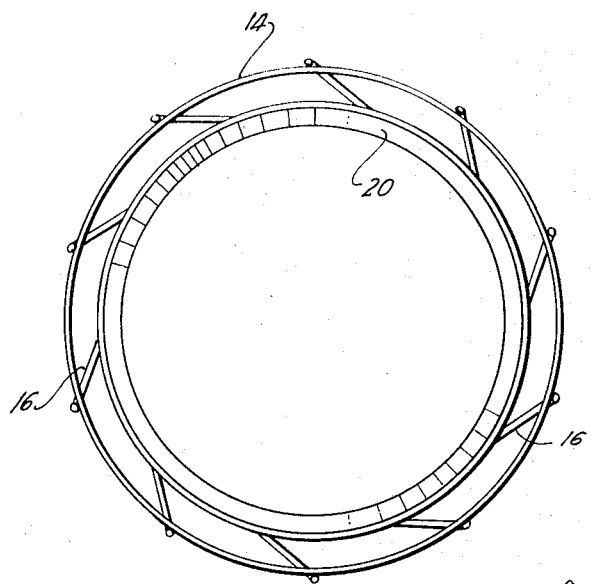
FIG. 2 is a top view of the feeder.
Figure 3:
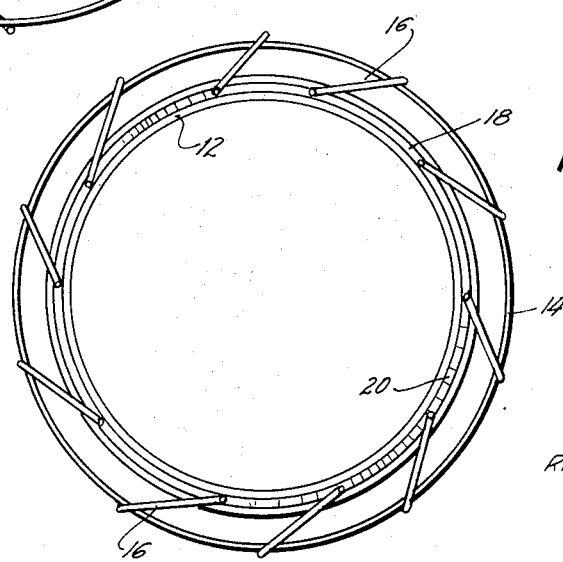
FIG. 3 is a bottom view of the animal feeder.

Turning now to FIGS. 1-3, there is illustrated an open-bottomed mobile animal feeder, particularly a cattle feeder. The cattle feeder is in the shape generally of an inverted, truncated cone. Circular ring 12 forms the base of animal feeder 10. The top of the feeder is formed by circular ring 14 spaced above and parallel to base ring 12. Access openings to the feeder are provided by a plurality of parallel, spaced-apart posts 16 angularly disposed between the top and bottom rings. In general, in order to permit easy access for feeding animals, the posts are disposed at an angle from 30° to 70°, and particularly 60° from the base ring. In its simplest form, animal feed in the form of hay, alfafa or silage is introduced into the open top of the feeder through circular ring 14. The hay falls to the ground within the general confines of base ring 12 and posts 16.

In order to provide additional internal support for the feeder and to prevent spillage of feed through the posts, intermediate ring 18 is provided. Intermediate ring 18 is spaced parallel to top ring 14 and base ring 12. To further reduce feed loss through the posts, annular band 20 is provided adjacent the base of the feeder.

The various elements of the animal feeder may be constructed from metal, plastic or wood materials. For most purposes, however, it is preferred to employ metal elements. Rings 12, 14 and 18, as well as posts 16 are preferably formed from conventional metal pipe tubing. Band 18 is preferably formed from sheet metal or fiberglass although it may be formed from a rigid plastic material. Posts 16 are connected at their respective ends with rings 12 and 14 by weldments or by conventional bolts. Similarly, ring 18 is welded or bolted to posts 16. Sheet metal band 20 is perferably welded at the top to ring 18, and, at the bottom, to ring 12.

The height and diameter of the hay feeder may be varied between wide ranges. A workable hay feeder is constructed from posts 16 formed from pipe sections, each section 4 feet long with a 2 foot width between successive sections. Typically, a hay feeder will be 6 feet in diameter.

Although not illustrated, a base formed from a rigid material, such as plywood, could be affixed to base ring 12 of the feeder in order to further reduce feed losses and to prevent mud and the like from contaminating the feed. Such a feature is illustrated in the hay feeders of FIGS. 4–10.

Figure 4:
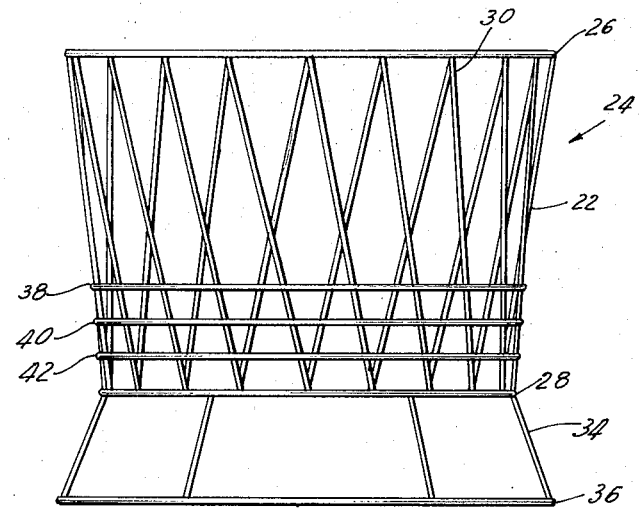
FIG. 4 is a perspective view of a second embodiment of the invention.
Figure 5:
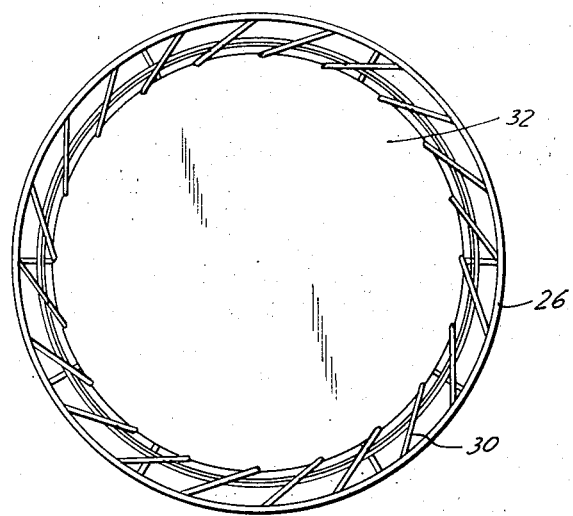
FIG. 5 is a top view of the second embodiment of the invention.
Figure 6:
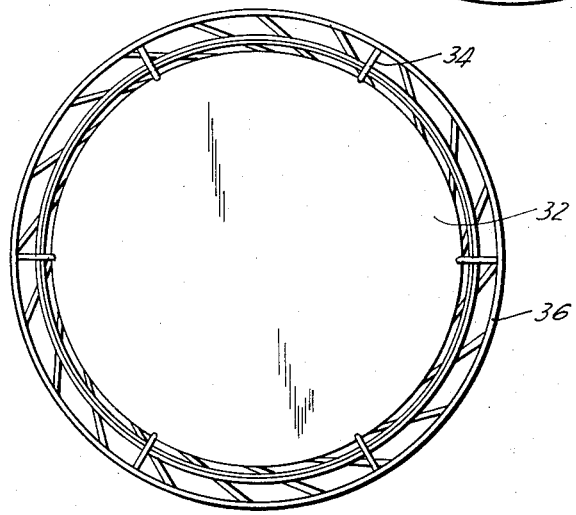
FIG. 6 is a bottom view of the second embodiment of the invention.

Turning now to FIGS. 4–6, there is illustrated a second embodiment of the invention. The feed-containing shell 22 of hay feeder 24 is very similar in construction to the hay feeder 10 illustrated in FIGS. 1–3. In particular, the feed containing portion is formed from circular top ring 26 spaced apart from parallel circular bottom ring 28. Top ring 26 is of a greater diameter than bottom ring 28. The top and bottom rings are connected by a series of parallel, spaced apart posts 30 angularly disposed between the top and bottom rings.

In order to support the feed above the ground a circular base 32 is spaced within the bottom ring 28. Base 32 is supported from the ground by means of a plurality of supporting struts 34. Struts 34 are supported by base ring 36. Base ring 36 is disposed in parallel vertical alignment with rings 26 and 28. It will be obvious that hay feeder 24 may be conveniently moved to a desired feeding location by tilting it on its side and rolling it over the ground supported by rings 26 and 36.

In order to provide further internal support for feed containing shell 22 and in order to reduce feed which might be lost through the sides of the feed containing portion, a series of parallel intermediate rings 38, 40 and 42 are provided. The intermediate rings are spaced immediately above and in parallel relation to bottom ring 28.

The various elements of hay feeder 24 are formed from rigid materials and, particularly from pipe-tubing. Posts 30 are connected at one end to top ring 26 and, at the other end, to bottom ring 28 by weldments or by bolting. Similarly, intermediate rings 38, 40 and 42 are connected to posts 30 by welding or by bolting. Again, supporting struts 34 are connected, at one end, to base ring 36 by welding or bolting and, at the other end, are bolted to plywood base 32. In the hay feeder depicted in FIGS. 4–6, the various pipe-tubing elements are welded together.

A typical hay feeder based on FIGS. 4–6, has a plywood base 32, 6 feet in diameter. The hay feeder is 6 feet high and is supported 1 foot off the ground by supporting struts 34. The diameter of top ring 26 and base ring 36 is 7½ feet.

In use, the hay feeder is rolled to a convenient point in the fields and pivoted to an upright position. The desired animal feed is loaded thorugh the top of the feeder and settles onto base 32. Animals are then permited to feed through the access openings adjacent angular posts 30.

The hay feeder of the invention offers various improvements over prior art hay feeders. The construction of the hay feeder permits easy access to feed without adjustment of chains, shackles or the like. The feed supporting shell of the unit is spaced away from the ground in order to prevent mud and the like from mixing with the feed. The top ring of the hay feeder is of greater diameter than the bottom supporting ring, consequently, the resulting inverted truncated cone shape of the feed shell tends to even out the distribution of feed therein.

Figure 7:
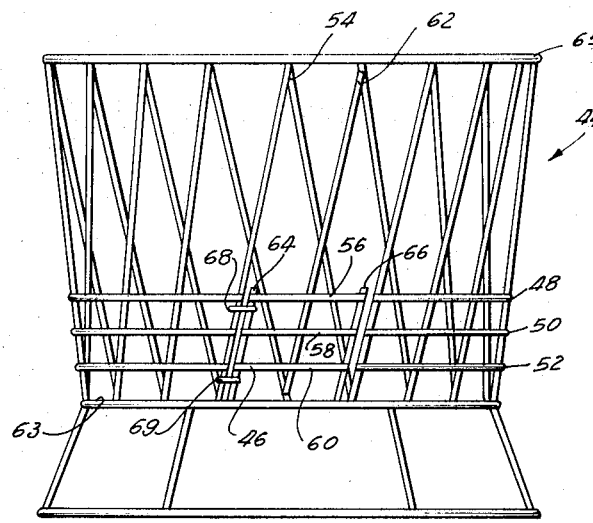
FIG. 7 is a perspective view of the third embodiment of the invention including a pivotable side gate.
Figure 8:
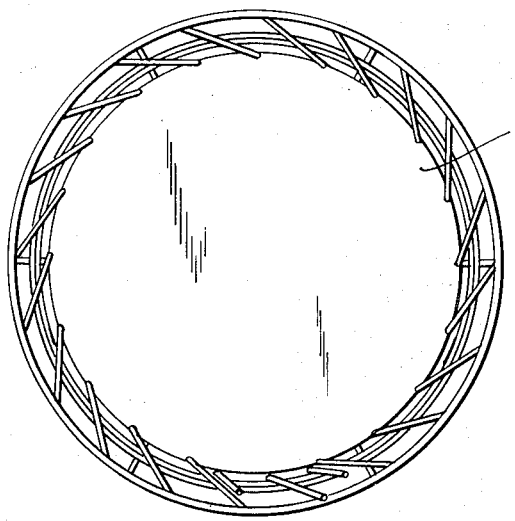
FIG. 8 is a top view of the third embodiment of the invention.
Figure 9:
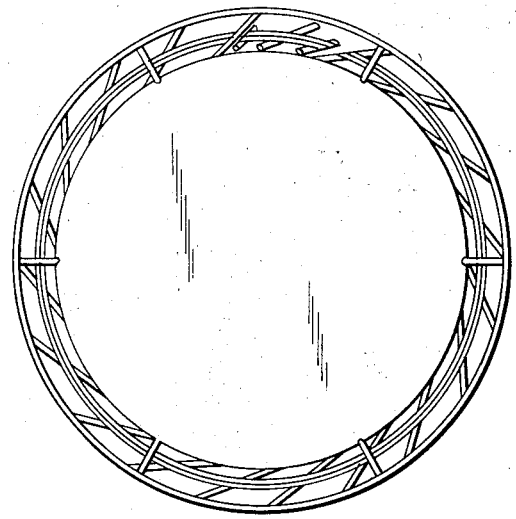
FIG. 9 is a bottom view of the third embodiment of the invention.

Referring now to FIGS. 7–9, there is depicted a hay feeder similar in construction to that illustrated in FIGS. 4–6. In order to permit animal feed such as hay, alfafa and silage to be readily introduced into the feed containing shell 44 of the feeder illustrated therein, a gate 46 is pivotally connected to the intermediate rings 48, 50 and 52.

As illustrated in FIG. 7, gate 46 is pivotally connected to one of the angularly disposed vertical posts 54 which connect the top and bottom rings of the feed containing shell. The gate is adapted to form a portion of the intermediate ring structure when in its closed position. For this purpose, the gate has a series of parallel, horizontal members 56, 58 and 60, spaced in axial alignment with intermediate rings 48, 50 and 51. Angularly disposed central post 62 terminates just above the feed base 63 of the feed containing shell at one end and, at the other end, terminates immediately below the top ring 65 of the hay feeder. In this manner the structural integrity of the hay feeder is not compromised. Post 62 is spaced in parallel alignment with supporting posts 54.

The sides of the gate are formed from parallel spaced apart struts 64 and 66. Struts 64 and 66 are aligned in parallel relation with post 62 and supporting posts 54. Gate 46 is hingedly connected to vertical post 54 by a pair of parallel spaced-apart hinges 68, 69. The hinges can be formed from circular metal tubing.

In use, the gate is pivoted about the hinges and feed is introduced through the side of the hay feeder. After the desired amount of feed is introduced into the feeder, the gate is closed. The weight of the metal tubing employed in the gate is sufficient to hold the gate in place during animal feeding operations. If desired, a hollow socket (not shown) as illustrated in FIG. 10 can be affixed to the base of the unit to support gate post 62 in its closed position.

Figure 10:
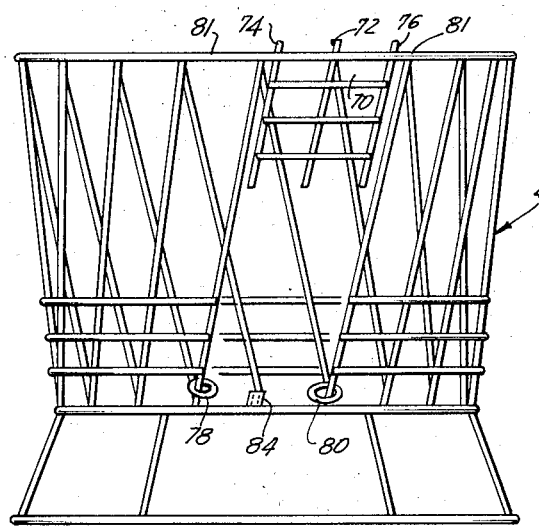
FIG. 10 is a perspective view of another embodiment of the invention including a vertically slidable side gate; wherein the gate is in an open, raised position.
Figure 11:
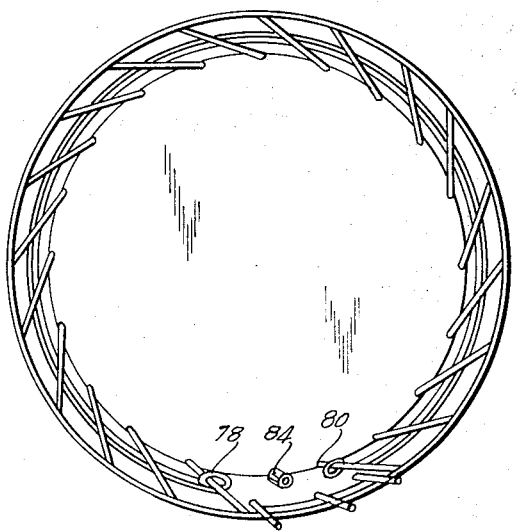
FIG. 11 is a top view of the invention illustrated in FIG. 10 wherein the gate is in the closed, lowered position.
Figure 12:
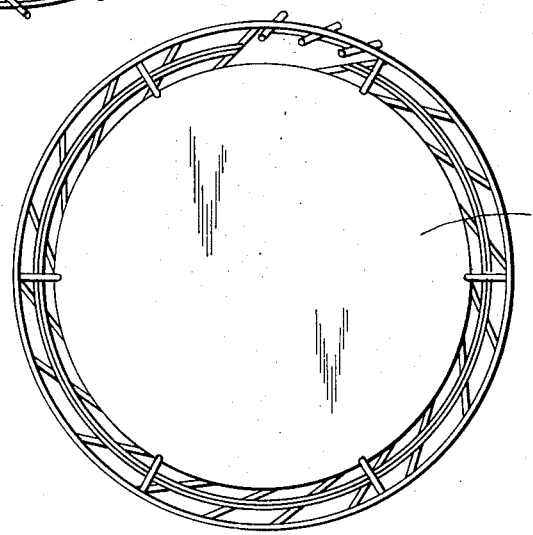
FIG. 12 is a bottom view of the embodiment of the invention illustrated in FIG. 10.

In FIGS. 10–12 there is illustrated an alternate gate structure. Gate 70 is of substantially identical configuration to gate 46 as illustrated in FIGS. 7–9. However central supporting post 72 is adapted to be telescoped upon itself. As illustrated in FIGS. 10 and 12, the gate is in the raised position.

When in a lowered position with respect to the base of the hay feeder as seen in FIG. 11, the sides of the gate, formed by posts 74 and 76, are held against lateral movement of retaining rings 78 and 80 spaced on posts 81. Central telescoping post 72 is adapted to be seated into upwardly projecting hollow socket 84. Socket 84 may be welded on the base ring or bolted to the plywood base 86.

In use, gate 70 is manually raised and locked in its raised postion by conventional procedures. If desired, a locking collar is spaced on telescoping post 72 adjacent the top ring for this purpose. Thereafter, feed is introduced into the side of the feeder in the now-opened section of the intermediate rings. When the desired amount of feed is present in the feeder, gate 70 is lowered by releasing the locking mechanism. Posts 74 and 76 are held against movement by retaining rings 78 and 80. Central post 72 is stabilized against movement within socket 84. As illustrated in FIG. 11, the hay feeder is then ready to dispense feed.

While several somewhat preferred embodiments of the invention have been described in detail herein, various other modifications and changes may be made without departing from the scope of the invention. The invention is not to be limited except as set forth in the following claims.

I claim:

1. In a portable animal feeder having first and second vertically spaced annular rings, the improvement which comprises:
    a plurality of substantially parallel posts disposed at an acute angle to said rings and connecting said rings, said posts spaced sufficiently apart to permit unimpeded entry of animal heads during feeding;
    means for supporting said second ring above the ground the supporting means comprising a supporting ring in parallel relation with said first and second rings and a plurality of supporting struts connected at one end of the supporting ring and, at the other end, to said second ring, said second annular ring having a substantially smaller diameter than the first annular ring so that the feeder has the overall shape of an inverted frustum and the supporting ring having a diameter substantially equal to the diameter of the first annular ring so that the supporting means has the form of an outwardly flared base;
    an annular floor means mounted on said feeder adjacent said second ring; and blocking means circumferentially disposed above said floor to prevent spillage of animal feed placed in said feeder.

2. The invention in accordance with claim 1 in which the blocking means is a circular band of sheet metal.

3. The invention in accordance with claim 1 in which said blocking means comprises a plurality of vertically spaced intermediate annular rings supported by said posts.

4. The invention in accordance with claim 3 including a gate pivotally connected to said intermediate rings to permit side loading of animal feed into said feeder.

5. The invention in accordance with claim 3 including a gate slidably connected to said top vertical ring, said gate vertically movable between a closed position abutting said floor and an open position spaced sufficiently above said floor to permit feed to be loaded into said feeder.

* * * * *